Nov. 1, 1927.

C. SUZUKI 1,647,483

CORN EXPANSION MACHINE

Filed March 26, 1924

Inventor
C. Suzuki
By Marks & Clerk
Attys.

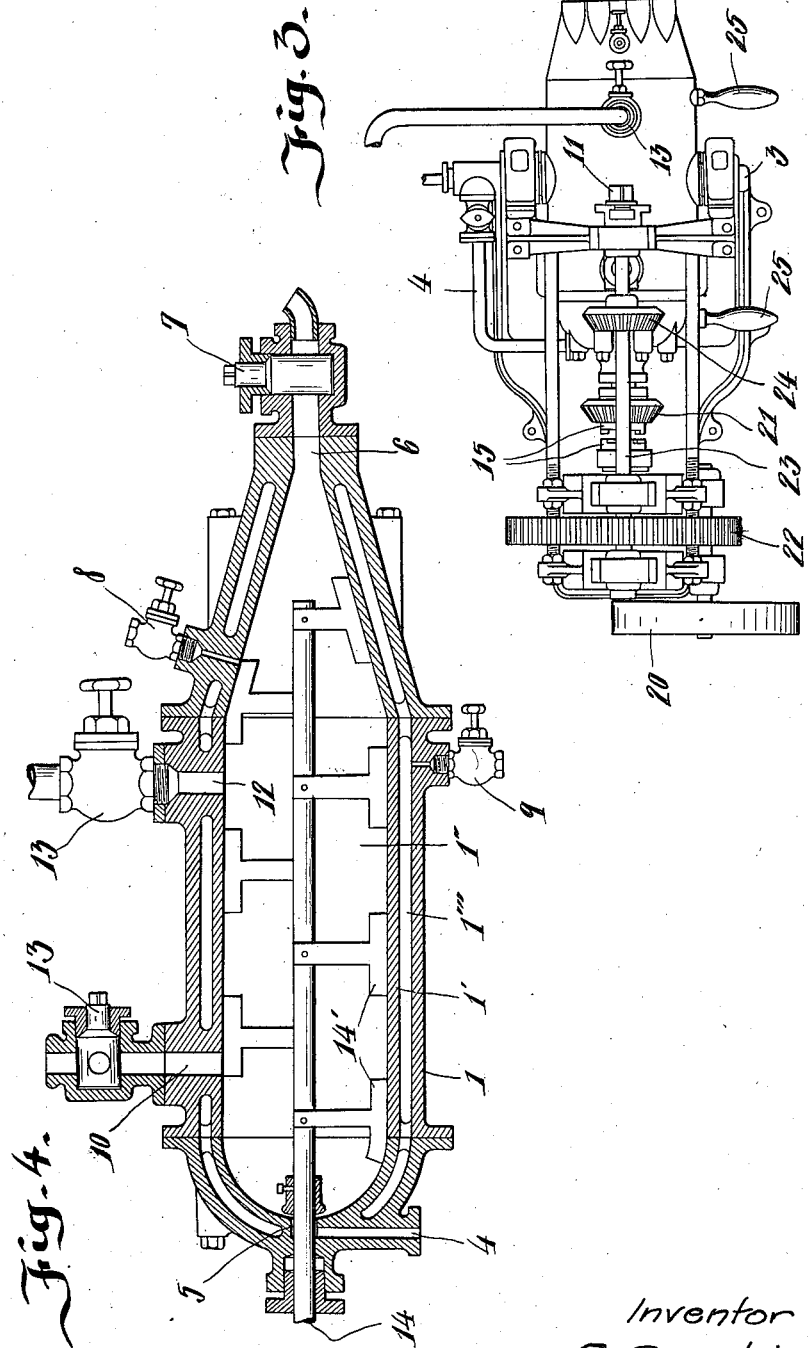

Patented Nov. 1, 1927.

1,647,483

UNITED STATES PATENT OFFICE.

CHUJIRO SUZUKI, OF TOKYO, JAPAN.

CORN-EXPANSION MACHINE.

Application filed March 26, 1924. Serial No. 702,156.

The present invention relates to a machine for puffing cereals and more particularly to mechanism for agitating the cereal during the puffing process.

It is an object of this invention to provide a steam chamber adapted to be tipped to discharge the puffed cereal. It is a further object to provide an agitating member in the chamber and means to drive the agitator in a horizontal as well as an inclined position. Other objects will be apparent from the following description of the invention taken in connection with the accompanying drawings in which:

Fig. 3 is a top view of the machine; and

Fig. 4 is a vertical sectional view taken through the steam chamber.

Figure 1:
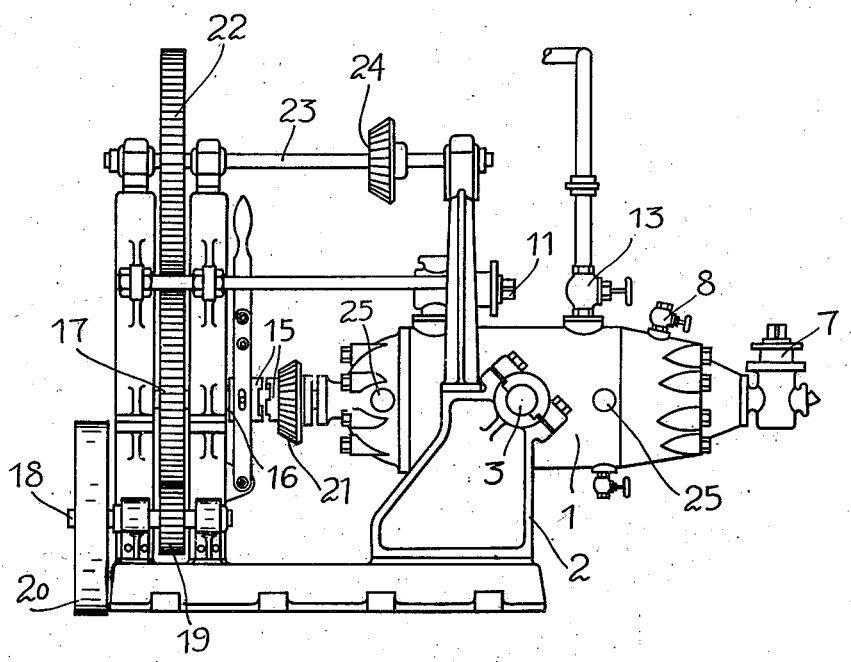
Fig. 1 is a front elevation of the preferred form of the machine.
Figure 2:
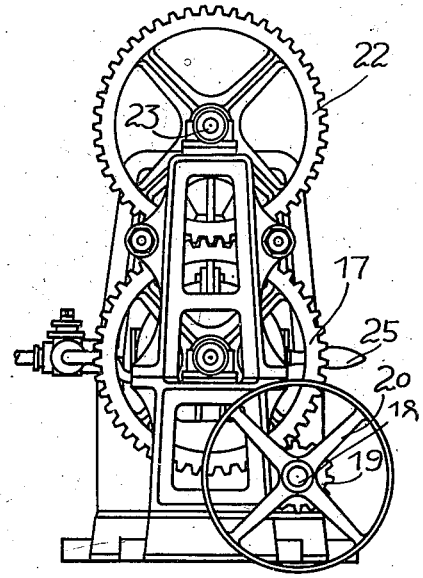
Fig. 2 is a side elevation of the machine shown in Fig. 1.

Referring to the drawing, the chamber 1″ is provided with a double wall 1, 1′, within which is a steam jacket 1‴. The chamber is supported on a bracket 2 by trunnions 3 to permit tipping of the chamber. At one end of the chamber is a steam inlet connected to a supply pipe 4, which supplies steam to the steam jacket 1‴ and to the interior of the chamber 1″ through an opening 5 in the wall 1′ of the chamber.

As shown in Fig. 3 the steam pipe is provided with a connection to a steam supply, the connection being located on one of the trunnions 3 so that the pipe 4 may be carried with the chamber as it is tipped about the trunnions 3.

At its opposite end the chamber is conical shaped and is provided with a discharge opening 6 through which cereal may be ejected after it has been subjected to a puffing operation. The discharge opening 6 may be opened or closed by means of a valve 7. Drain cocks 8 and 9 are provided for the steam chamber 1″ and the steam jacket respectively. The cereal to be treated is introduced into the steam chamber 1″ through a supply opening 10 adapted to be opened or closed by a suitable valve 11. The steam chamber is also connected to a suction pump through the opening 12 which is controlled by a valve 13.

Within the chamber 1″ is a series of agitating blades 14′ secured to a shaft 14, this shaft being adapted to be rotated through a clutch 15 by the counter-shaft 16 to which is secured the gear 17. Secured to the drive shaft 18 is a driving pinion 19 meshing with the gear 17, the shaft 18 being driven by means of a pulley 20 connected to a suitable source of power. Also secured to the shaft 14 is a beveled pinion 21.

A second counter-shaft 23 is rotated by means of a gear 22 meshing with the gear 17 and secured to this counter-shaft is a beveled pinion 24 with which the beveled pinion 21 is adapted to mesh when the chamber 1″ is tipped at an angle of about 45°. A handle 25 on the chamber is provided so that the chamber may be tipped by hand.

The operation of the machine is as follows:

The valves 7, 8, 9 and 13 being closed and the steam supply cut off, the valve 11 is opened and cereal is introduced into the chamber 1″. The valve 11 is now closed and the steam supply pipe 4 is opened, permitting steam to enter the chamber and the steam jacket. At the same time the shaft 14 is connected through the clutch 15 to the driving mechanism. In this manner the cereal is thoroughly agitated by the rotation of the blades 14′ during the heating operation. When the cereal has reached the proper temperature the valve 13 is opened and the steam supply is cut off. Immediately there is a great reduction of pressure within the chamber, this reduction causing the flakes or kernels of cereals to expand. The chamber is now tipped until it has assumed a position at about 45° to its horizontal position. When the chamber is in this inclined position the gear 21 meshes with the gear 24 thus permitting further agitation of the material within the chamber.

The valve 13 is now closed, the valve 7 and the steam supply pipe 4 then being opened. The steam within the chamber will eject the puffed cereal, the agitating blades 14′ aiding in this operation.

Having thus described the invention, what I claim is:—

In combination, driving mechanism including a plurality of spaced driving elements, a pivotally mounted chamber, an agitator in the chamber provided with a driven element adapted to be connected with either of the driving elements for driving the agitator while the chamber is in either a substantially horizontal position or in an oblique position, means for introducing steam into the chamber and for discharging steam from the chamber, and means for introducing material to be treated into the chamber and for discharging the same from one end of the chamber.

In testimony whereof I affix my signature.

CHUJIRO SUZUKI.